US 9,465,875 B2

(12) United States Patent
Barkol et al.

(10) Patent No.: US 9,465,875 B2
(45) Date of Patent: Oct. 11, 2016

(54) SEARCHING BASED ON AN IDENTIFIER OF A SEARCHER

(75) Inventors: Omer Barkol, Haifa (IL); Shahar Golan, Haifa (IL); Michal Aharon, Haifa (IL); Reuth Vexler, Alonei Abba (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 407 days.

(21) Appl. No.: 13/484,396

(22) Filed: May 31, 2012

(65) Prior Publication Data

US 2013/0325852 A1 Dec. 5, 2013

(51) Int. Cl.
*G06F 17/30* (2006.01)

(52) U.S. Cl.
CPC ................ *G06F 17/30867* (2013.01)

(58) Field of Classification Search
CPC .................. G06F 17/30867; G06F 17/30864;
G06F 17/3053; G06F 17/30554; G06F
17/30861; G06F 17/30648; G06F 17/3064;
G06F 17/30672; G06F 17/30702; G06F
17/3097; G06F 17/30979; G06F 17/30522;
G06F 17/30; G06F 17/30011; G06F
17/30663; G06F 17/30038; G06F 17/30389;
G06F 17/30654; G06F 17/30448; G06F
17/30967; G06F 17/30528; G06F 17/30675;
G06F 17/30646; G06F 17/30395; Y10S
707/99933; Y10S 707/99935; Y10S
707/99934
USPC ...................................................... 707/723
See application file for complete search history.

(56) References Cited

U.S. PATENT DOCUMENTS

| 7,685,276 B2 | 3/2010 | Konig |
| 7,716,223 B2 | 5/2010 | Haveliwala |
| 7,756,855 B2 | 7/2010 | Ismalon |
| 7,761,464 B2 | 7/2010 | Radlinski |
| 7,783,636 B2 | 8/2010 | Church |
| 8,515,985 B1 * | 8/2013 | Zhou ................ G06F 17/30646 707/767 |
| 2005/0160083 A1 * | 7/2005 | Robinson ........................ 707/3 |
| 2005/0234879 A1 * | 10/2005 | Zeng et al. ....................... 707/3 |
| 2005/0278317 A1 * | 12/2005 | Gross ............... G06F 17/30867 |
| 2006/0161520 A1 * | 7/2006 | Brewer et al. ..................... 707/3 |
| 2006/0271520 A1 * | 11/2006 | Ragan ............... G06F 17/30663 |
| 2007/0271247 A1 * | 11/2007 | Best et al. ........................ 707/3 |
| 2009/0171941 A1 * | 7/2009 | Stern et al. ....................... 707/5 |
| 2013/0110827 A1 * | 5/2013 | Nabar ................... G06Q 10/00 707/728 |

FOREIGN PATENT DOCUMENTS

| WO | WO-0146669 | 6/2001 |
| WO | 02061628 A1 | 8/2002 |
| WO | WO-02061628 | 8/2002 |

OTHER PUBLICATIONS

Buckley et al., Automatic Query Expansion Using SMART : TREC 3, 1995 (11 pages).
Xu et al., Query Expansion Using Local and Global Document Analysis, 1996 (8 pages).

(Continued)

*Primary Examiner* — Evan Aspinwall
(74) *Attorney, Agent, or Firm* — Trop, Pruner & Hu, P.C.

(57) ABSTRACT

A query is received to search data, where the query includes a search term. A search of the data is performed in response to the query, wherein the search produces result data based on the search term and an identifier of a searcher submitting the query.

17 Claims, 3 Drawing Sheets

(56) References Cited

OTHER PUBLICATIONS

Fonseca et al., Concept-Based Interactive Query Expansion, CIKM Oct./Nov. 2005 (8 pages).
Xiang et al., Context-Aware Ranking in Web Search, SIGIR Jul. 2010 (8 pages).
Shen et al., Context-Sensitive Information Retrieval Using Implicit Feedback, SIGIR Aug. 2005 (8 pages).
Wang et al., Exploring Online Social Activities for Adaptive Search Personalization, CIKM Oct. 2010 (10 pages).
Cui et al., Probabilistic Query Expansion using Query Logs, May 2002 (8 pages).
Chirita et al., Personalized Query Expansion for the Web, SIGIR Jul. 2007 (8 pages).
Autonomy K2 Roadmap White Paper, 2006 (16 pages).
Salton et al., A Vector Space Model for Automatic Indexing, Communications of the ACM, Nov. 1975 (8 pages).
Deerwester et al., Indexing by Latent Semantic Analysis, Journal of the American Society for Information Science Sep. 1990 (17 pages).
Govindaraju et al., Similar Document Search and Recommendation, HPL-2011-150, Sep. 2011 (11 pages).
Ciesielski et al., Contextual Adaptive Clustering with Personalization, 2007 (11 pages).
Aharon et al., The PARIS Algorithm for Determining Latent Topics, 2010 IEEE International Conference on Data Mining Workshops (8 pages).
Wang et al., Concept Forest: A New Ontology-assisted Text Document Similarity Measurement Method, 2007 (7 pages).

* cited by examiner

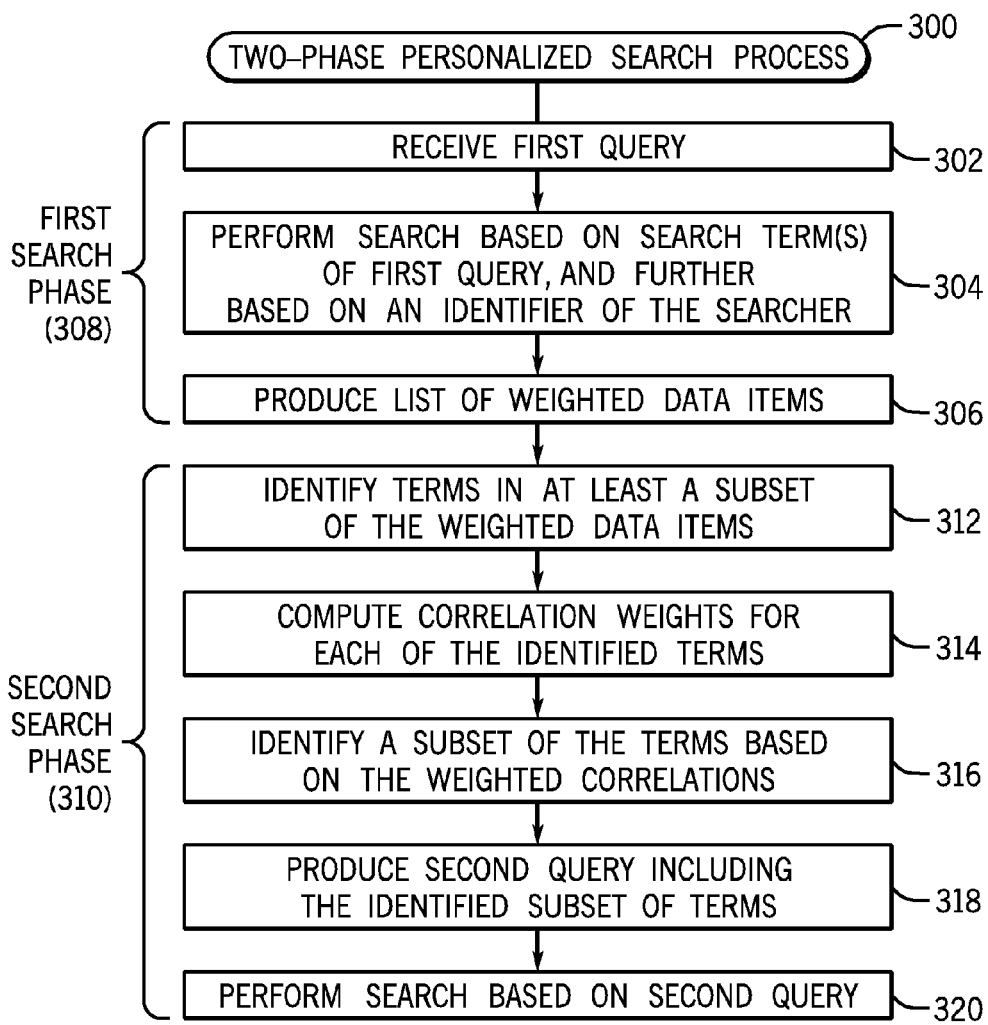

SEARCHING BASED ON AN IDENTIFIER OF A SEARCHER

BACKGROUND

Search engines can be used to search data available at various data sources, including websites, data sources within an enterprise, and so forth. There can be a relatively large number of data items returned in a search result produced by a search engine in response to a query. These data items can be ranked in some order, based on predefined criteria.

BRIEF DESCRIPTION OF THE DRAWINGS

Some embodiments are described with respect to the following figures:

FIGS. 2 and 3 are flow diagrams of personalized search processes according to various implementations.

DETAILED DESCRIPTION

Figure 1:
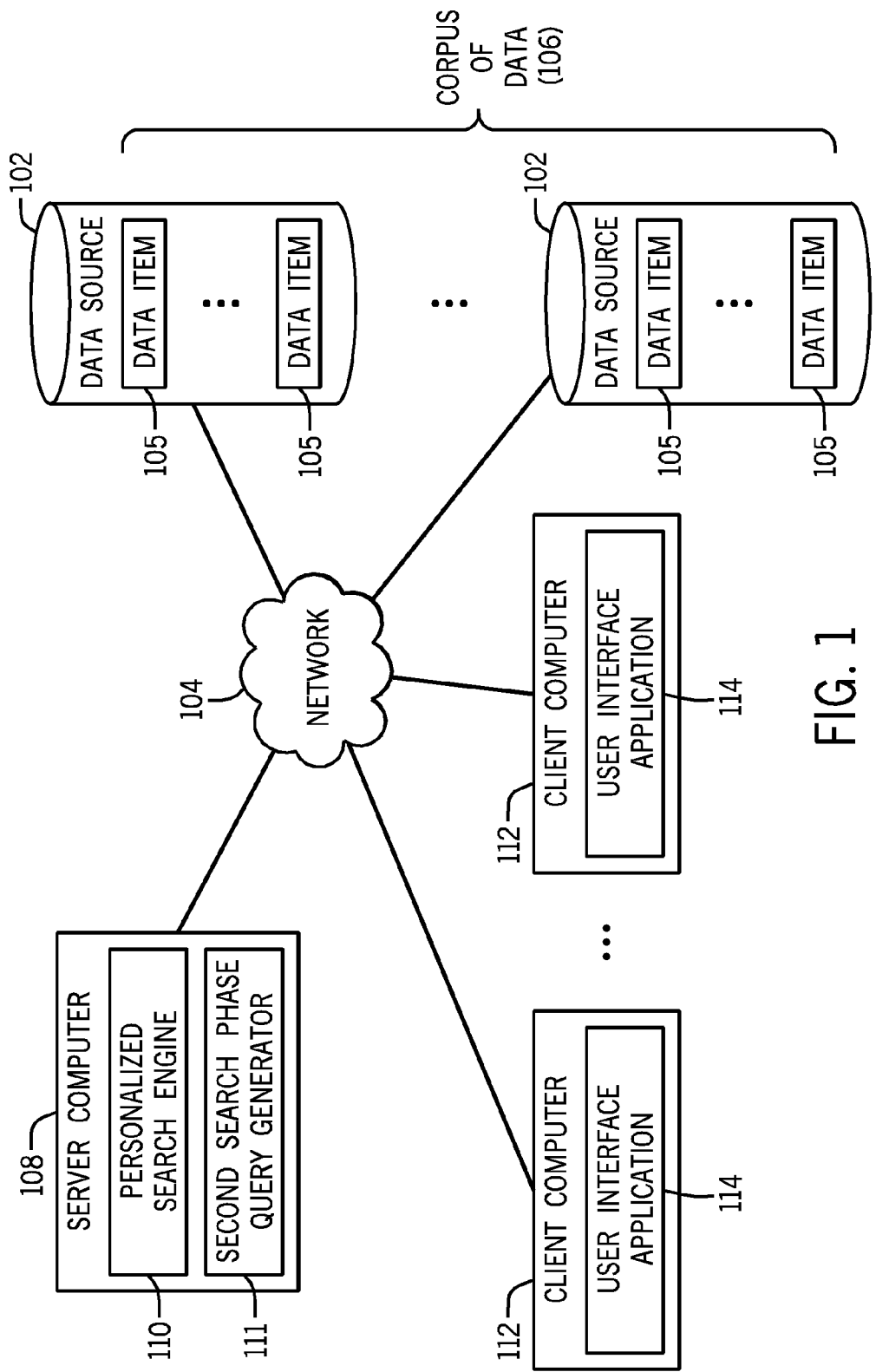
FIG. 1 is a block diagram of an example arrangement that includes a personalized search engine according to some implementations.

To improve search results returned to users in response to search queries, personalized searching can be performed. Personalized searching can refer to a search that considers search terms of a query as well as personal information associated with a searcher who submitted the query. "Improving" a search result can refer to producing a search result having data items identified by a search that is more likely to be relevant to the search term(s) of a submitted query.

Personalized searching can be accomplished by performing query expansion, where a search based on a query that contains at least one search term is expanded to also consider personal information associated with the user. In some examples, query expansion can be based on a personal profile of a user that was created ahead of time based on various information associated with the user. A personal profile can include concepts or topics that describe the interests of the user. After creation, the content of the personal profile of the user can be used in performing query expansion for personalized searching. However, creating personal profiles for users can be a relatively time-consuming or complex task. In addition, personal profiles can become out-of-date after some time has passed, since user interests may have changed.

In accordance with some implementations, rather than rely on creating personal profiles for users, personalized searching can be based on personal content associated with the user that is already part of a corpus of data that is to be searched. A "corpus of data" can refer to any collection of data, whether included in public websites, internal data sources of an enterprise (e.g., a business concern, government agency, educational organization, etc.), or other data sources. Personal content of the user can include various types of content, including, as examples, presentation slides, text documents, e-mails, conversation logs, social networking posts, and so forth.

Personal content can be considered to "involve" the corresponding user, where content is considered to "involve" a user if the content is authored by the user, is received by the user, or is produced based on participation of the user. In some examples, personal content can also be considered to "involve" the corresponding user if the content is authored by a related party, is received by the related party, or is produced based on participation of the related party, where the related party can be another user that has some predefined relationship with the target user (e.g., the target user's co-worker, the target user's family member, etc.).

Content involving a user contains, is referred by, or is otherwise associated with an identifier of the user. Although reference is made to personalized searches for users, note that in other examples, personalized searches can be performed in response to queries submitted by other types of entities, such as applications, computers, and so forth. More generally, personalized searching according to some implementations can be performed in response to queries submitted by searchers, where a "searcher" can include a user or any other type of requesting entity.

FIG. 1 is a block diagram of an example arrangement that incorporates some implementations. FIG. 1 includes various data sources 102 (implemented with storage devices) that are coupled to a data network 104. The data sources 102 can store data items 105 that make up a corpus of data (106). The data sources 102 can be internal data sources of an enterprise, public data sources available over the Internet, or a combination of internal and public data sources. Examples of the data items 105 can include text files, image files, video files, audio files, presentation slides, e-mails, conversation logs, social networking posts, and so forth.

A server computer 108 coupled to the data network 104 has a personalized search engine 110 according to some implementations. The personalized search engine 110 is able to perform personalized searching that produces result data based on search term(s) of a query as well as an identifier of a searcher that submitted the query. The identifier of the searcher can include a name (such as the proper name) of the searcher, an address (such as a physical address or a network address, e.g., Internet Protocol address) of the searcher, a telephone number of the searcher, or any other identifier of the searcher. In further examples, the identifier can be based on some combination of the foregoing. Including a combination of multiple elements, such as a name, address, and/or telephone number of the searcher, can produce result data that contains data items that are more likely to be relevant to the searcher. The result data produced in response to the query can include selected data items 105 from the corpus of data 106.

The identifier of the searcher is obtained independently of a search input provided by the searcher to produce the query. For example, the identifier is not a search term entered by the searcher at a given client computer 112 to generate the query. Rather, the identifier of the searcher is obtained from another source, such as from login information provided by the searcher when initially logging into the given client computer 112, or from pre-stored information (e.g., cookie or other file) in the given client computer 112. Alternatively, the identifier of the searcher can be obtained by the server computer 108 from a different source. For example, upon receiving a query from the given client computer 112, the server computer 108 can access this different source (e.g., a database, a lookup table, a list, etc.) to retrieve the identifier of the searcher that is associated with the given client computer 112.

At least a portion of the result data produced in response to the query includes content that involves the searcher, where such content can include any of the various example data items mentioned above. Identifying content involving the searcher, based on the identifier of the searcher that submitted the query, allows for performance of personalized searching that uses such identified content. In some examples, the result data can include a collection of data items that match the search term(s) of the query. Within this collection, data items that involve the searcher (e.g., was authored by the searcher, was received by the searcher, or otherwise was produced based on participation of the searcher) can be ranked higher than other data items.

Since personalized searching according to some implementations employ content that is already part of the corpus of data (106) being searched, the personalized searching is considered an adaptive, on-line personalized searching, since the personalization automatically adapts to changes in content that involve the searcher (e.g., new content being added, old content being deleted, content being modified, etc.).

The server computer 108 of FIG. 1 also includes a second search phase query generator 111 according to some implementations. The second search phase query generator 111 is used to create a second query for use in a two-phase personalized search process (discussed further below).

FIG. 1 further depicts a number of client computers 112 connected to the data network 104, where each client computer has a user interface application 114 through which a user can submit a query to the server computer 108. Examples of the user interface application 114 include a web browser or any other type of application that presents a user interface in which a user can enter search terms.

FIG. 2 is a personalized search process 200 according to some implementations. The process 200 can be performed by the personalized search engine 110 of FIG. 1, for example. The process 200 receives (at 202) a query (such as from a client computer 112) to search data in the corpus of data 106, where the query includes a search term (or multiple search terms). In response to the query, the process 200 performs (at 204) a search of the corpus of data 106. The search produces result data based on the search term (or search terms) in the query, and further based on an identifier of the searcher that submitted the query. At least a portion of the result data includes content that involves the searcher identified by the identifier.

Query expansion is performed in the personalized search process 200 of FIG. 2 by considering information of the searcher (the identifier of the searcher) that is not part of the search term(s) contained in the received query.

In further implementations, query expansion can further include performance of another search phase that uses the result data produced by the search depicted in FIG. 2. In such further implementations, the tasks of FIG. 2 are considered to be part of a first search phase. A second search phase performs a further search based on search terms derived from the result data of the first search phase.

In some implementations, query expansion based on the two-phase searching noted above can be referred to as query expansion based on relevance feedback. Relevance feedback is based on the following concept. A search engine responds to a first query by providing a ranked list of result data items. This list of result data items can then be analyzed to create a second query, which contains search terms that are different from the search terms of the first query. One type of relevance feedback is pseudo relevance feedback, which produces search terms for the second query by using the top-ranked result data items from the first query, where "top-ranked" result data items can refer to some predefined number of data items in the result data that are considered to be the most relevant according to at least one ranking criterion.

FIG. 3 is a flow diagram of a two-phase personalized search process 300 according to some implementations (which uses query expansion based on relevance feedback). The process 300 has two search phases 308 and 310, where the first search phase 308 includes tasks 302, 304, and 306, and the second search phase 310 includes tasks 312, 314, 316, 318, and 320. The process 300 can be performed by the personalized search engine 110 and second search phase query generator 111 of FIG. 1.

The personalized search engine 110 receives (at 302) a first query, which is based on input from the searcher. For example, the searcher may have entered an input search string (containing one or multiple search terms) into a user interface application 114 (FIG. 1) that displays a user interface associated with a particular search engine (e.g., 110 in FIG. 1). In response to the entered search string, the corresponding client computer 112 produces a query that is sent to the personalized search engine 110 of the server computer 108 depicted in FIG. 1.

In response to the received first query, the personalized search engine 110 performs (at 304) a search based on the search term(s) of the first query, and further based on the identifier of the searcher. As noted above, the identifier of the searcher is obtained independently of the input search string provided by the searcher. Rather, the identifier of the searcher is obtained from another source (different from the input search string), such as from login information provided by the searcher when initially logging into a given client computer 112, or from pre-stored information (e.g., cookie or other file) in the given client computer 112. This identifier obtained from the source can be provided by the given client computer 112 to the server computer 108 with the search query. Alternatively, the identifier of the searcher can be obtained by the server computer 108 from a different source. For example, upon receiving a query from the given client computer 112, the server computer 108 can access this different source (e.g., a database, a lookup table, a list, etc.) to retrieve the identifier of the searcher that is associated with the given client computer 112.

The personalized search engine 110 according to some examples can be an inverted index search engine. An inverted index can refer to an index data structure that stores a mapping from content (such as words, numbers, or other terms) to locations in a corpus of data (e.g., 106 in FIG. 1). The inverted index search engine, upon receiving a query containing one or multiple search terms, accesses the inverted index based on the search term(s) of the query to identify locations of data items that contain the search term(s). An example of an inverted index search engine is a Lucene™ search engine from the Apache Software Foundation. Other examples of inverted index search engines can be used in other implementations.

The search engine 110 produces (at 306) a list of weighted data items in the result data for the first query. A data item having a higher rank is assigned a higher weight. The list of weighted data items can be in the following form: $(ID_1, w_1)$, $(ID_2, w_2), \ldots, (ID_n, w_n)$, where n (which can be greater than or equal to one) represents a number of data items in the result data. In the foregoing, $ID_i$ represents an identifier of a data item identified by the search 304 in FIG. 3, and $w_i$ represents the weight assigned to the data item identified by $ID_i$. A data item in the result data produced in response to the search 304 of FIG. 3 can have a corresponding rank assigned to the data item based on at least one criterion that relates to relevance of the data item to the search. This rank can be used for producing the weight $w_i$.

The list of weighted data items is ordered according to the weights, such as in a descending order (or other order). More generally, the process of FIG. 3 can produce (at 306) a data structure that contains information relating to data items identified by the search 304, where the information can include identifiers of the data items (or alternatively, the data items themselves), as well as indications of rankings associated with the respective data items.

In the second search phase 310 of the process 300, the second search phase query creator 111 next identifies (at 312) terms within the weighted data items produced in the first search phase 308, and more particularly, within at least a subset of the weighted data items. The subset can include the top-m data items according to the assigned weights $w_i$, where m can be some predefined number greater than or equal to 1. Pre-processing can be applied to the various terms in the weighted data items to remove certain words that are unlikely to aid in returning relevant results. Pre-processing can omit stop words, which are frequently-occurring words, such as "that," "then," "when," etc. Pre-processing can also involve stemming, in which words are converted to their stem (which refers to the base or root form of the word). For example, the stem for "transferring" is "transfer," the stem for "ideas" is "idea," and so forth.

For each term j in at least the subset of the weighted data items produced in the first search phase 308, a correlation weight is computed (at 314) by the query creator 111, where the correlation weight is based on correlation between the term j and the subset of weighted data items. In some examples, the correlation weight can be computed as follows:

$$\frac{\sum_i (w_i - W)(\delta_{ij} - DF_j)}{\sqrt{\sum_i (w_i - W)^2} \sqrt{\sum_i (\delta_{ij} - DF_j)^2}}, \quad \text{(Eq. 1)}$$

where i is iterated through the subset of weighted data items, W is a constant (e.g., the mean weight assigned to a predefined first number of the weighted data items), $\delta_{ij}$ is an indicator indicating whether the term j appears in the $i^{th}$ data item, and $DF_j$ is the frequency of the term j in the overall corpus of data (e.g., 106 in FIG. 1). In some examples, $\delta_{ij}$ can have the value zero if the term j does not appear in the $i^{th}$ data item, and can have a predefined non-zero value if the term j appears in the $i^{th}$ data item.

Note that if a term j does not appear in the $i^{th}$ document, then the value calculated according to Eq. 1 can be negative, since $\delta_{ij}$ is equal to zero. On the other hand, if the term j appears in the $i^{th}$ document, then $\delta_{ij}$ is equal to a non-zero value, and the value $(\delta_{ij} - DF_j)$ can be a positive value. Note also that if a weight $w_i$ is less than the value of W (which can be the mean weight of a first number of the weighted data items), then the value of $(w_i - W)$ can also be a negative value.

A higher value of the correlation weight computed according to Eq. 1 for a term j indicates that the term j has a higher frequency of occurrence in higher weighted data items as compared to the frequency of occurrence in the overall corpus of data (106).

In other examples, other types of correlation weights can be computed to correlate each term j with data items in at least the subset of the weighted data items produced in the first search phase 308.

The query creator 111 next identifies (at 316) at least a subset of the terms j, where the identified subset can be the terms associated with a predefined top number of terms according to the correlation weights calculated according to Eq. 1. Generally, the identification of the subset of the terms j is based on ranking of the terms, which according to some examples uses the correlation weights according to Eq. 1.

For example, the top-most correlated terms identified based on the correlation weights (some predefined top number of terms associated with the highest correlation weights) can be used as the search terms for the second query, which can be submitted to the search engine 110. The query creator 111 then produces (at 318) a second query that includes the identified subset of the terms. Note that the correlation weights can be submitted with the search terms in the second query to the search engine 110. The search engine 110 then performs (at 320) another search based on the second query. The search results produced in response to the second query can then be provided back to the client computer 112 that submitted the first query.

An example of the foregoing process is provided below. A news reporter may desire to search a corpus of data that includes news articles. The news reporter enters a search term, such as "smartphone," at a client computer 112 (FIG. 1) to find news articles relating to "smartphone." In response, a first query is produced that is submitted to the personalized search engine 110 (FIG. 1). In response to the first query, the search engine 110 performs a search based on the search term "smartphone," and further based on the identifier (e.g., name) of the news reporter. This search produces a list of news articles that are relevant to "smartphone," some of which may have been authored by the news reporter—the news articles authored by the news reporter may be ranked higher in the list of news articles. The news articles in the list are associated with respective weights.

The foregoing tasks are part of the first search phase 308 depicted in FIG. 3. In the second search phase 310, terms in at least a subset of the weighted news articles are identified, and correlation weights are computed for each of the identified terms as discussed in connection with FIG. 3. Based on the correlation weights, a subset of the terms are identified and included in a second query. The second search phase 310 then processes the second query to again search the corpus of news articles. The news articles found in response to the second query are returned to the news reporter who requested the search.

In the foregoing, it is assumed that the first query submitted to the search engine 110 includes a search string entered by the searcher. In other implementations, similar techniques can be applied in the context of determining data item similarity (such as document similarity). Data item similarity refers to identifying at least one result data item that is similar to an input data item. To perform data item similarity determination, the input data item is parsed to identify terms derived in the content of the input data item. Pre-processing can be performed on the terms of the input data item, such as to omit stop words and to perform stemming. Terms can consider the tf-idf (where tf stands for term frequency and idf refers to inverse document frequency of the entire corpus) of each term to decide the probability of the term's importance for the input data item. In other examples, other techniques for selecting terms for performing data item similarity computation can be performed.

Once the terms are extracted, the personalized search process of FIG. 2 or 3 can be performed, in accordance with some implementations, to identify result data items that are similar to the input data item.

In an example, a searcher may desire to find news articles in a corpus that are similar to an input news article about the birth of an elephant in a zoo in Los Angeles. To perform such search, terms from the input news article are extracted, and a query containing the terms is produced. The process of FIG. 2 or 3 can then be performed in response to the query.

Figure 4:
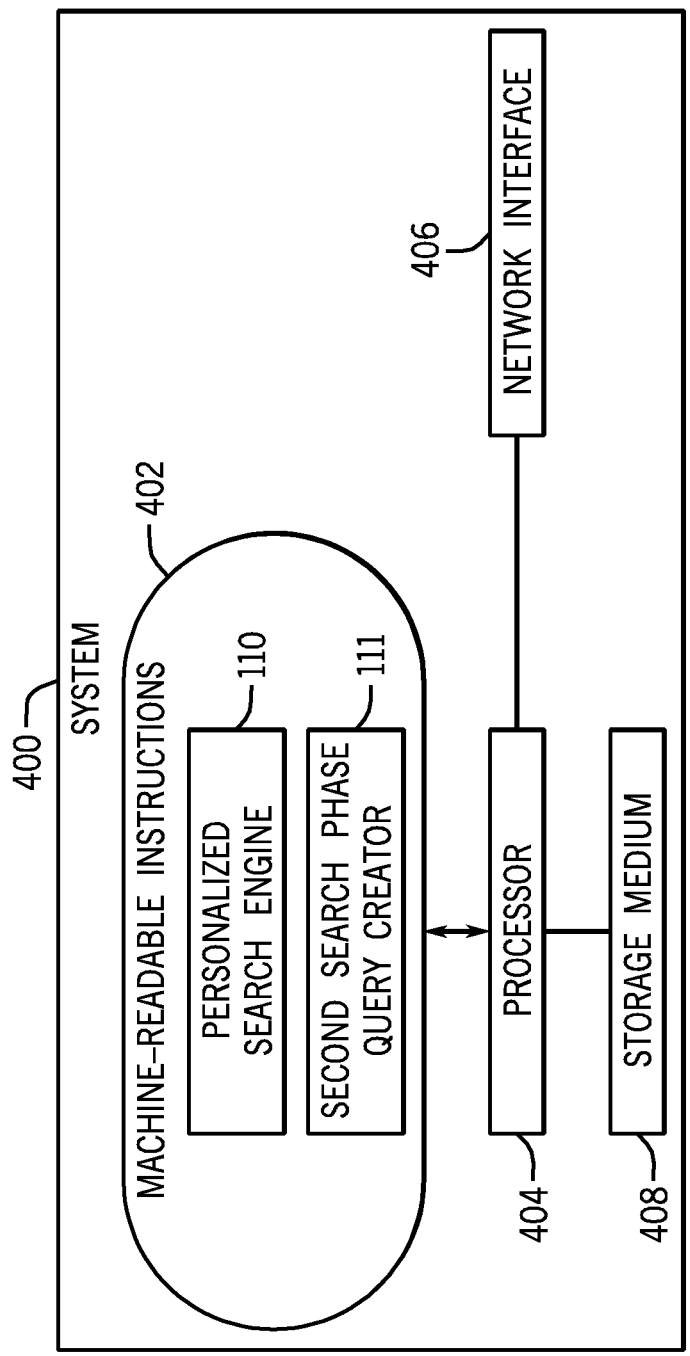
FIG. 4 is a block diagram of an example system incorporating some implementations.

FIG. 4 is a block diagram of an example system 400, which can be an example implementation of the server computer 108 of FIG. 1. The system 400 can include machine-readable instructions 402 that can include instructions corresponding to the personalized search engine 110 and/or second query creator 111 of FIG. 1. The machine-readable instructions 402 are executable on one or multiple processors 404, which can be coupled to a network interface 406 (to allow the system 400 to communicate over a data network) and to a storage medium (or storage media) 408 (to store data). A processor can include a microprocessor, microcontroller, processor module or subsystem, programmable integrated circuit, programmable gate array, or another control or computing device.

The storage medium (or storage media) 408 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of multi-phased personalized searching, comprising:
   performing by a computer system:
      performing a search of data in response to a first query and an identifier of a searcher, wherein the search produces result data based on a search term in the first query and the identifier of the searcher;
      selecting a first subset of terms in data items of a subset of data items in the result data;
      computing correlation weights for corresponding terms in the first subset of terms, where each of the correlation weights is based on correlation of the corresponding term to data items in the subset of data items;
      selecting a second subset of the terms in the first subset of terms according to the correlation weights;
      producing a second query containing the second subset of terms; and
      processing the second query to perform further searching that retrieves data items matching the second subset of terms from public websites available over an Internet,
   wherein the multi-phase personalized searching includes:
      a first search phase comprising receiving the first query, obtaining the identifier of the searcher, and the performing of the search of the data in response to the first query and the identifier of the searcher, and
      a second search phase comprising the selecting of the first subset of terms, the computing of the correlation weights, the selecting of the second subset of the terms in the first subset of terms, and the producing of the second query.

2. The method of claim 1, wherein at least a portion of the result data includes content involving the searcher identified by the identifier, and wherein the content involving the searcher includes at least one selected from among a data item authored by the searcher, a data item received by the searcher, and a data item produced based on participation of the searcher.

3. The method of claim 1, wherein receiving the first query includes receiving the first query responsive to the search input including a search string entered by the searcher.

4. The method of claim 1, wherein receiving the first query includes receiving the first query that contains terms of an input data item for use in identifying at least one result data item that is similar to the input data item.

5. The method of claim 1, further comprising:
   ranking data items in the result data according to relevancy of the data items to the search performed in response to the first query; and
   selecting the subset of the data items in the result data based on the ranking.

6. The method of claim 1, wherein the identifier of the searcher is obtained independently of a search input provided by the searcher to produce the first query.

7. An article comprising at least one non-transitory machine-readable storage medium storing instructions to perform multi-phase personalized searching, the instructions upon execution by a computer system causing the computer system to:
   perform a first search of a corpus of data based on a first query containing a search term, and based on an identifier of a searcher that submitted the first query;
   rank data items in result data produced by the first search, the ranking according to relevance of the data items to the first search;
   select a subset of the data items in the result data based on the ranking; select a first subset of terms in data items of the subset of data items; compute correlation weights for corresponding terms in the first subset of terms, where each of the correlation weights is based on correlation of the corresponding term to data items in the subset of data items;
   select a second subset of the terms in the first subset of terms according to the correlation weights;

produce a second query that contains the terms in the second subset of terms; and perform a second search of the corpus of data based on the second query, the second search retrieving data items matching the second subset of terms in the second query from public websites available over an Internet.

8. The article of claim 7, wherein the terms in the subset of data items include at least one term in a data item received by the searcher.

9. The article of claim 7, wherein the first query contains the search term entered as a search string by the searcher.

10. The article of claim 7, wherein the first query contains search terms extracted from an input data item.

11. The article of claim 10, wherein the second search produces further result data containing data items that are similar to the input data item.

12. The article of claim 7, wherein the first search produces the result data from public websites available over the Internet based on the search term and the identifier of the searcher.

13. A system comprising:
at least one processor to perform multi-phase personalized searching comprising:
a first search phase comprising:
receiving a first query to search data, the first query including terms of an input data item, where the first query is to identify result data items that are similar to the input data item, and
performing a search of the data in response to the first query, wherein the search produces result data based on the terms and an identifier of a searcher submitting the first query, where at least a portion of the result data includes content involving the searcher identified by the identifier; and
a second search phase comprising:
selecting a first subset of terms in data items of a subset of data items in the result data,
computing correlation weights for corresponding terms in the first subset of terms, where each of the correlation weights is based on correlation of the corresponding term to data items in the subset of data items,
selecting a second subset of the terms in the first subset of terms according to the correlation weights,
creating a second query containing the second subset of terms; and
returning further result data produced by a second search responsive to the second query, the second search performed after the search responsive to the first query.

14. The system of claim 13, wherein the second search retrieves data items matching the second subset of terms in the second query from public websites available over an Internet.

15. The system of claim 13, wherein the identifier of the searcher is obtained independently of a search input provided by the searcher to produce the first query.

16. The system of claim 13, wherein the search in response to the first query is performed using the terms of the first query and the identifier of the searcher against data sources including public websites available over an Internet.

17. The system of claim 13, wherein the at least one processor is to further:
rank data items in the result data produced by the search in response to the first query, the ranking according to relevancy of the data items to the search performed in response to the first query;
select the subset of the data items in the result data based on the ranking.

* * * * *